Feb. 10, 1948.                      C. OTTO                      2,435,898
                       PRODUCTION OF AMMONIUM SULPHATE
                             Filed Jan. 29, 1943
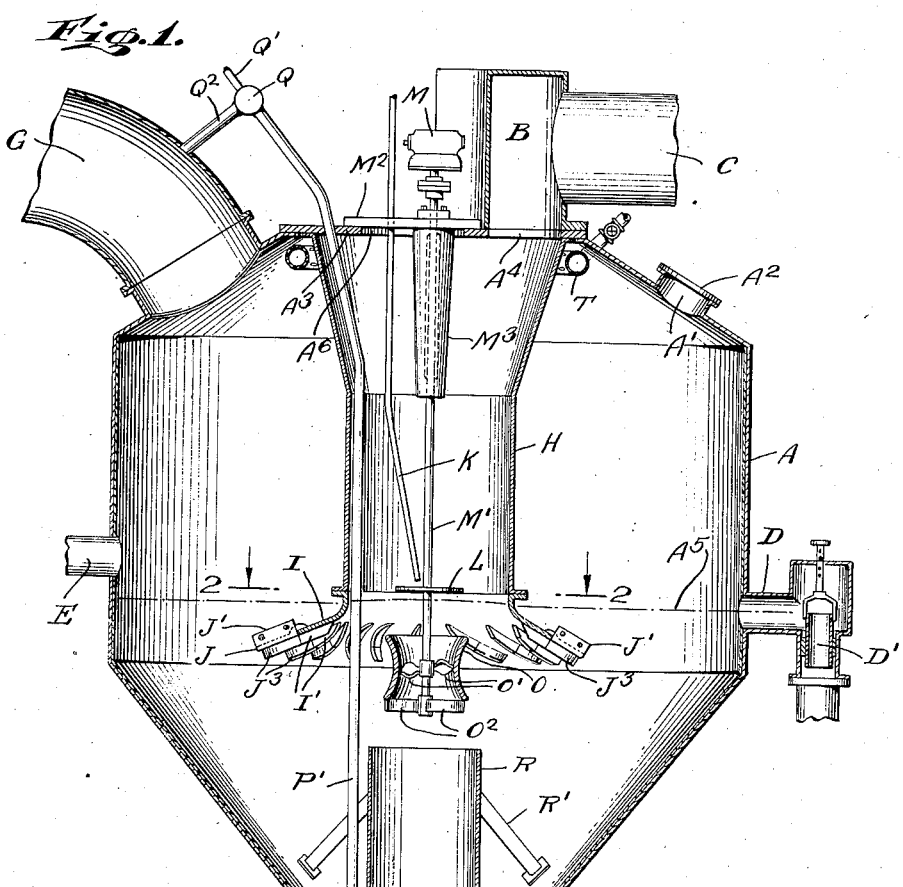
INVENTOR
CARL OTTO
BY
John E. Hubbell
ATTORNEY Patented Feb. 10, 1948

2,435,898

UNITED STATES PATENT OFFICE 2,435,898

PRODUCTION OF AMMONIUM SULPHATE

Carl Otto, Manhasset, N. Y., assignor to Fuel Refining Corporation, New York, N. Y., a corporation of Delaware Application January 29, 1943, Serial No. 473,951

2 Claims. (Cl. 23—119)

The general object of the present invention is to provide an improved method of and improved apparatus for converting the ammonia content of distillation gas, and particularly of coke oven gas, into ammonia sulphate by passing the gas into a so-called saturator containing a bath of weak sulphuric acid with which the gas is brought into scrubbing contact, so that the ammonia elements in the gas and the sulphate crystal radicals combine to form sulphate of ammonia which subsequently crystallizes out of the solution.

The invention relates specifically to the construction and operation of a saturator adapted for use in the production of relatively large sulphate of ammonia crystals, and in which the gas is brought into contact with the bath by passing it downward through a vertically disposed cracker pipe terminating at its lower end in a flared discharge mouth extending down into the bath liquor for several inches.

Heretofore, very little of the substantial amount of sulphate of ammonia produced in this country by passing coke oven gas through saturators, has been in the form of large crystals. However, the term "large," as used herein, is well established in the art and indicates crystals of an average size and weight, several times that of the finer crystals heretofore customarily produced. For example, the term "Grade I" ammonium sulphate crystals is well known as comprising crystals of which 40% are too large to pass a 35 mesh screen and only 5% are small enough to pass through a 70 mesh screen, whereas of the fine sulphate of ammonium crystals commonly produced in saturators, 80% or more will pass through a 35 mesh screen and about 40% of such crystals will pass through a 70 mesh screen.

The production of large crystals of sulphate of ammonia in the general manner described, requires the use in the saturator of sulphuric acid bath liquor of somewhat lower acidity than is commonly and advantageously employed when finer crystals are made. Thus, for example, the acidity of the bath liquor commonly employed in the production of fine crystals is that corresponding to a bath liquor, sulphuric acid content of 7 per cent or higher, whereas the acidity of the bath liquor employed in the production of large crystals may well be that corresponding to a bath liquor, sulphuric acid content of 5.5 per cent or lower.

In the production of sulphate of ammonia in the general manner described, the crystals formed are initially minute and become large crystals only as a result of crystal growth requiring movement of the crystals relative to the "mother liquor" or bath liquor, out of which the fine crystals crystallize and in which they grow. A small sulphate of ammonia crystal increases in size, or grows, because it forms a nucleus for the attachment of other sulphate of ammonia crystallizing out of the bath liquor. For such growth it is practically essential that the acidity of the bath liquor should be lower than is necessary or customary in the production of fine crystals, and practically essential that the bath liquor be subjected to agitation or recirculation so that each small crystal may be continually moving out of immediate contact with bath liquor which lacks, and be moving into immediate contact with bath liquor which does not lack sulphate of ammonia available for immediate attachment to the growing crystal.

The relatively low acidity of the bath liquor employed in the production of large sulphate of ammonia crystals, requires an increase in the extent and/or effectiveness of the scrubbing contact of the gas and bath liquor, over that required to separate the ammonia from the same volume of gas brought into scrubbing contact with bath liquor of higher acidity. Furthermore, the low acidity of the bath liquor tends to the deposit on the inner surface of the saturator of solidified masses of sulphate of ammonia which resemble ordinary rock salt, and are commonly referred to as "rock salt." The tendency to such deposits is augmented by steps of the character hereinafter described, by which the extent and effectiveness of the scrubbing contact of the gas with the bath liquor is increased.

A primary object of the present invention is to prevent or materially retard rock salt deposits on the inner or under surface of the flaring discharge mouth of the cracker pipe, where such deposits are especially objectionable because they reduce the effectiveness of the scrubbing contact of the gas and bath liquor.

I attain the last mentioned object of the invention by continuously supplying the "make-up" acid which must be added to the bath liquor to maintain the desired bath acidity, in the form of a spray discharged against the inner wall of the cracker pipe, preferably adjacent its lower end. I thus form an acid film flowing under the action of gravity along the inner side of the flared discharge cracker pipe mouth to the rim of the latter. Although the gas and bath liquor will wash more or less of the film forming acid off the inner side of the discharge mouth, the said film, in consequence of its high sulphate of ammonia solubility, will prevent, or materially impede, sulphate deposits on the inner surface of the discharge mouth.

A further important object of the invention is to increase the extent and effectiveness of the scrubbing contact of the gas and bath liquor, and for the attainment of this object I have devised simple and practically effective means for increasing the diameter of the lower end of the cracker pipe mouth piece, and for effecting a local circulation of the liquor within and below said mouth piece, and I so proportion and arrange said mouth piece that gas passing through the cracker pipe at the normal load rate will impart turbulent flow to the bath liquor immediately below said mouth piece. The local circulation which I provide operates to maintain a bath liquor level within the space beneath the cracker pipe and its discharge mouth, which is higher adjacent the central portion of said space than in the rim portion of said space, and thereby maintains a liquor flow in the upper portion of said space radially away from the center of said space. I increase the diameter of the lower end of the cracker pipe mouth piece in accordance with the present invention by adding to a mouth piece, which may be of a known type now in use, an annular rim extension formed in sections which may be inserted in the saturator tank through a manhole opening and then assembled end to end and suitably connected within the tank.

The above described local bath circulation and the extension of the mouth piece diameter, each contribute to a gas and bath liquor scrubbing contact more extensive and effective than has been employed heretofore, without requiring a corresponding increase in the pressure drop or head loss required to move the gas through the saturator and contribute to increased saturator operative capacity, and may be used in the saturators producing either fine or large crystals.

A further object of the invention is to provide simple and effective means for utilizing a small portion of the gas moving through the saturator in effecting circulatory movements in the lower portion of the saturator bath to effect the growth of fine crystals into large crystals.

The various features of novelty which characterize my invention are pointed out with particularity in the claims annexed to and forming a part of this specification. For a better understanding of the invention, however, its advantages, and specific objects attained with its use, reference should be had to the accompanying drawings and descriptive matter in which I have illustrated and described preferred embodiments of the invention.

Of the drawings:

Fig. 1 is a somewhat diagrammatic sectional elevation of an ammonia saturator;

Fig. 2 is a section on the line 2—2 of Fig. 1;

Fig. 3 is a reproduction on a larger scale of a portion of the cracker pipe shown in section on Fig. 1; and Fig. 4 is a partial section taken similarly to Fig. 1 and illustrating a form of means for spraying acid against the cracker pipe wall.

The saturator shown in Fig. 1 comprises a tank or shell A which for the most part is of conventional form and construction. As shown, the shell A is formed with an opening A' normally closed by a manhole cover $A^2$. The top portion of the tank structure comprises a horizontal head $A^3$ formed with an aperture $A^4$ for the passage of the gas to be treated into the saturator from an arc shaped gas chamber B supported on said head and to which gas is supplied by the gas main C. The saturator shell has an outlet D for the overflow of bath liquor from the saturator to a tar separator (not shown) through a connection including a vertically adjustable sleeve or pipe section D', the level of the upper end of which determines the height of the bath level $A^5$ maintained in the saturator. The saturator also includes an inlet E for the return of bath liquor withdrawn from the tank in various ways, including in particular, the bath liquor leaving the saturator through the outlet D and subsequently separated from the tar which it carries out of the saturator, and the bath liquor withdrawn from the saturator to serve as a carrying stream for sulphate crystals collecting in the hopper bottom portion of the tank.

As shown, the crystals so collecting and a carrying stream of bath liquor are withdrawn through a bottom outlet F in the saturator wall which is connected through a pipe F' to means (not shown) for separating the crystals and bath liquor. The gas which has been treated in the saturator passes away from the latter through an outlet passage G opening to an upper portion of the saturator wall. The gas passing into the saturator through the opening $A^4$ is received in the upper end of a vertical cracker pipe H suspended from the top wall of the saturator and provided at its lower end with a flaring discharge mouth piece I having its lower portion submerged in the bath liquor.

As those skilled in the art will understand, all portions of the saturator structure which come into contact with the bath liquor should be formed of Monel metal, bronze, lead or other material immune to attack by sulphuric acid, and the mouth piece I may well be a one piece lead casting with its maximum diameter small enough to permit its introduction into the saturator through the top wall opening normally closed by the head $A^3$. In accordance with the present invention the maximum diameter of the discharge mouth piece when in use is increased by providing it with an annular rim extension J. The latter is advantageously formed, as shown, of arc shaped sections having end flanges J' which abut and are bolted together as is shown clearly in Figs. 2 and 3, and which are so proportioned as to permit their insertion in the saturator tank through the manhole opening A'.

As shown, the rim extension J is formed at its inner edge with a shoulder or flange portion $J^2$ which overlaps, and rests on the upper side of, a rim portion of the member J. Advantageously, and as shown, the inner or under surface of the outwardly flared portion of the mouthpiece I is conical, as is the inner or under side of the rim extension J, and the elements of each of said conical surfaces are similarly inclined to the horizontal at a small angle which may well be about 14 or 15%. The adjacent ends of the inner surface of the conical rim portion of the member I and the inner surface of the member J are in register with one another and said surfaces may be regarded as adjacent sections of a single conical surface.

The make-up acid added to the bath to maintain the bath acidity is supplied through a pipe K which extends into the saturator through an opening $A^6$ in the upper head member $A^3$ and down to a level somewhat above the bath liquor level. As shown in Fig. 1 the acid passing through the pipe K is discharged onto a spray disc L carried by the vertical shaft M' of an electric driving motor M. The latter is mounted on a base member M², which is removably mounted on the head A² and normally forms a closure for the opening A⁶. As shown, the acid supply pipe K extends through the base member M² and is mechanically secured to the latter. With the motor M mounted as described, it is possible to bodily remove the motor M with its shaft M' and base member M², and the acid pipe K secured to said base member, when necessary for cleaning, inspection or repairs. To minimize risk of undue vibration of the shaft M' while avoiding interference with the ready removal of the motor M and its shaft M', an elongated bearing member M³ attached to the base member M² and extending down into the cracker pipe for a substantial distance, is provided with a bearing at its lower end for the shaft M'.

The shaft M' extends down into the bath liquor and at its lower end supports an impeller member O. The latter comprises a tubular body having its upper end portion outwardly flared and connected to the shaft M' by arms which are advantageously given propeller blade shapes, so as to create an upflow of bath liquor through the tubular body of the member O when the latter is rotated. In lieu of or in addition to the use of the spider arms O' as propeller blades, other impeller blades or vanes may be carried at the lower end of the member O and operate to create an upflow of liquid through the member O.

As will be apparent, with the shaft M' rotating at a suitable speed, for example, at a speed of 300 revolutions per minute, though the speed may be substantially higher or lower, the acid discharged onto the spray disc L will be discharged at the periphery of the disc in the form of a high velocity spray which impinges on the surrounding cracker pipe wall and forms a relatively thick acid film which moves under the action of gravity along the inner and under side of the mouth piece I and its extension J to the periphery of the latter. The rotation of the impeller O creates an upflowing stream of bath liquor surrounding the shaft M which raises the bath liquor level adjacent the shaft M' relative to the bath liquor level adjacent the internal wall of the cracker pipe. As it approaches the bath liquor level, the upflowing stream of bath liquor mushrooms out and moves radially away from the shaft. The action of the impeller O on the bath liquor within the space surrounded by the upper portion of the mouth piece I thus increases the effectiveness of the liquid and gas scrubbing contact, and the movement of the bath liquor away from the axis of the cracker pipe, due to the action of the impeller O, is augmented and extended by the action of the gas streams flowing along the flow paths defined by the curved ribs I' and their extensions J³, and contributes to a velocity of those streams high enough to impart turbulent flow to the bath liquor immediately adjacent said streams.

While the streams of gas and gas liquor wipe off and absorb some of the acid in the film flowing along the inner and under side of the discharge mouth I and its extension J, they also expedite that flow, and the high solubility for sulphate of ammonia of the film acid materially retards, if it does not wholly prevent, the formation of ammonium sulphate deposits on the inner or under side of the mouth piece, and thus avoids the interference with the desired scrubbing action created by such deposits when substantial.

To appreciate the advantages of the invention account should be taken of the dimensions and quantities involved. A single saturator of the character illustrated may well handle the entire gas output of a by-product coke oven plant carbonizing substantially more than 4,000 tons of coal per day, and producing gas at a rate in excess of two million cubic feet per hour. The internal diameter of the member I at its upper end may well be 4½ or 5 feet, and the diameter at its lower end may be 8½ feet. The diameter of the lower edge of the rim extension I in such case may well be 10½ or 11 feet. To maintain the bath acidity of such a saturator, make-up acid should be supplied by the pipe K at the rate of 4 gallons or more per minute or so.

For the production of large sulphate of ammonia crystals in apparatus of the character illustrated, it is practically essential to maintain a circulation including up and down components in the lower part, at least, of the hopper bottom portion of the saturator in which the crystals formed tend to collect. This circulation gives each minute crystal formed an opportunity to serve as a nucleus for the adhesion of other sulphate of ammonia crystallizing out of the liquor which is brought into contact with the nucleus by its circulation. The bath liquor thus circulated in the hopper bottom portion of the saturator carries with it substantially all of the relatively small crystals tending to collect in the lower portion of the saturator. As the crystals thus circulated increase in size, they eventually become heavy enough to settle out of the circulating liquor.

In the arrangement shown, the growth producing circulation of the crystals in the hopper bottom portion of the saturator, is created and maintained by upwardly directed jets of gas discharged through orifices in the upper side of a ring shaped spray pipe P which receives gas under suitable pressure from a steam ejector Q having a steam inlet Q' and having a gas inlet connection Q² to the saturator gas outlet pipe G. Advantageously in many cases, an open ended tubular member or tunnel R, coaxial with the cracker pipe and spray ring P, is arranged beneath the impeller O so that the upflow of bath liquor created by the spray ring jets will wholly or mainly pass up through the member R. As shown, the ring R has legs R' which bear against the inner wall of the hopper bottom position of the saturator shell and need not be referred thereto. When the crystals withdrawn from the saturator are removed through an outlet located as is the outlet F beneath a space in which fluid jets maintain a bath liquor upflow inlet, the circulating crystals are subjected to a screening action which tends to prevent the crystals from reaching the outlet until they have grown to a suitable discharge size.

With the low acidity needed for the production of large sulphate crystals in the general manner described, there is a tendency to objectionable deposits of sulphate of ammonia on exposed inner surfaces of the saturator. As disclosed in my copending application, Serial No. 473,949, filed January 29, 1943, now abandoned, such deposits may be avoided, or their formation materially retarded, by the continuous discharge of wash liquid at a suitable rate against the upper portion of the internal wall of the saturator tank, as by means which may consist of or include the wash water spray pipe T shown in Fig. 1. In said copending application, I disclose and claim subject matter invented by me which is disclosed but not claimed herein.

As will be apparent, the general principles of the present invention may be utilized and its advantages obtained with apparatus differing from that shown in Figs. 1, 2 and 3. Thus, for example, as shown in Fig. 4, the acid supply pipe K may be axially disposed in the cracker pipe H to discharge against the central conical portion S' of a deflector element S. The latter is formed with an annular trough S² surrounding said central portion S' and open at its upper side and having its bottom and side walls rounded. As shown, the member S is supported from the pipe K through arms S³. With the pipe K arranged as shown in Fig. 4 and some five or six feet long or longer, the velocity with which the acid is discharged from the pipe against the member S will be ample to effect the discharge of the acid from the periphery of the member S in a spray which impinges against the surrounding wall of the cracker pipe and thus creates the same sort of acid film flow over the under and inner sides of the discharge mouth I as is produced by the spraying action of the rotating spray disc L of Fig. 1. To better illustrate the form of the member S, the diameter of the latter as shown in Fig. 4, is larger relative to diameter of the cracker pipe and should insure gas flow through the cracker pipes more than is necessary or practically desirable.

Novel method and apparatus features concerned with the character and path of the flow of gas as the latter passes from the cracker pipe into the portion of the bath surrounding the rim of the cracker pipe mouthpiece which are disclosed but not claimed herein, are claimed in my copending application Serial No. 499,986, filed August 25, 1943, now Patent No. 2,423,794, issued July 8, 1947.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims; and that in some cases certain features of my invention may be used to advantage without a corresponding use of other features.

Having now described my invention, what I claim as new and desire to secure by Letters Patent, is:

1. In the method of producing sulphate of ammonia from distillation gases passed into scrubbing contact with bath liquor through a cracker pipe having a flared downwardly opening discharge mouth with its rim immersed in the bath liquor, the improvement which consists in maintaining an upflow of the bath liquor in the space within and immediately subjacent said mouth to thereby maintain a gas contacting bath liquor surface within said space which is higher adjacent the central portion of said space than adjacent said rim and to create a flow toward said rim of the liquor within said space.

2. A saturator for absorbing ammonia in sulphuric acid comprising in combination a saturator shell adapted to contain a bath of sulphuric acid in the lower portion thereof having a withdrawal pipe constructed and located so as to establish an intermediate level of liquid therein, a wide, vertically-disposed pipe extending downwardly into said shell and having a flared mouth below said intermediate level, inlet means for gases into said pipe, a vertically disposed rotatable shaft within said pipe extending below the mouth thereof, and impeller means at the lower end of the shaft constructed to cause circulation of liquid upwardly beneath said pipe and outwardly past the rim thereof by rotation of said shaft.

CARL OTTO.

REFERENCES CITED

The following references are of record in the file of this patent:

UNITED STATES PATENTS

| Number | Name | Date |
|---|---|---|
| 1,318,774 | La Bour | Oct. 14, 1919 |
| 1,936,308 | Mueller | Nov. 21, 1933 |
| 2,141,186 | Koppers | Dec. 27, 1938 |

FOREIGN PATENTS

| Number | Country | Date |
|---|---|---|
| 20,875 | Great Britain | 1910 |
| 361,935 | Great Britain | Nov. 25, 1931 |
| 648,540 | Germany | Aug. 3, 1937 |
| 655,465 | Germany | Jan. 15, 1938 |

OTHER REFERENCES

"The Gas World," Dec. 3, 1938, page 18, published by Benn Bros. Ltd., London.